No. 867,387. PATENTED OCT. 1, 1907.
L. C. LEOPOLD.
WAGON BRAKE.
APPLICATION FILED AUG. 10, 1906.

2 SHEETS—SHEET 1.

Witnesses
G. R. Thomas
F. G. Smith

Inventor
L. C. Leopold
By
Attorneys

No. 867,387. PATENTED OCT. 1, 1907.
L. C. LEOPOLD.
WAGON BRAKE.
APPLICATION FILED AUG. 10, 1906.
2 SHEETS—SHEET 2.
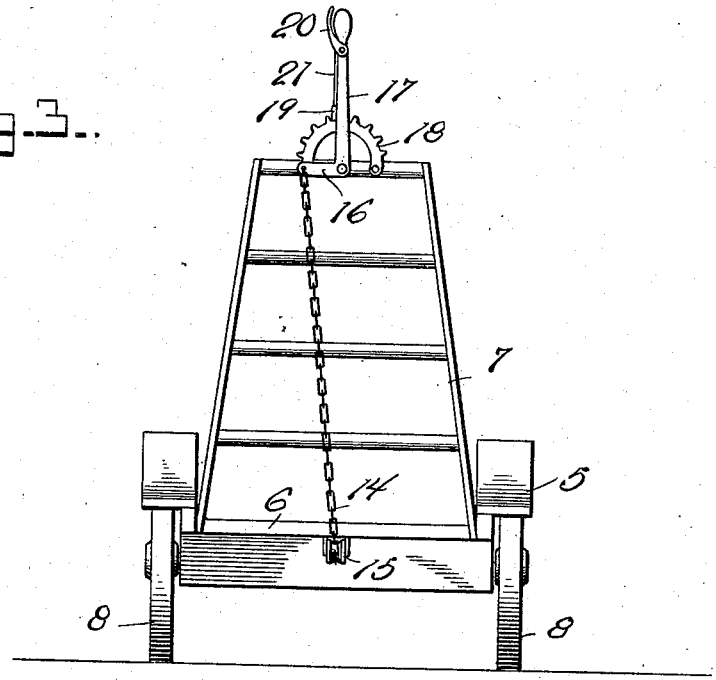
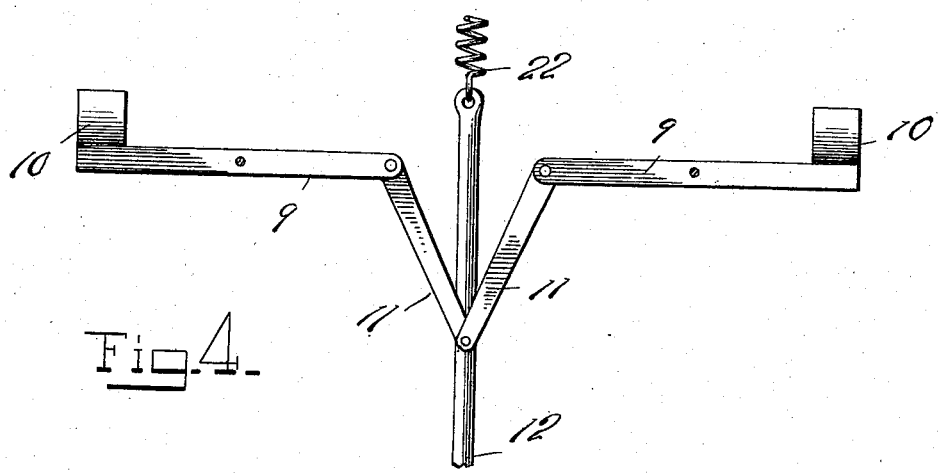
Witnesses
G. R. Thomas
F. G. Smith
Inventor
L. C. Leopold
By 
Attorneys

UNITED STATES PATENT OFFICE.

LOUIS C. LEOPOLD, OF HANCOCK, IOWA.

WAGON-BRAKE.

No. 867,387.  Specification of Letters Patent.  Patented Oct. 1, 1907.

Application filed August 10, 1906. Serial No. 330,086.

*To all whom it may concern:*

Be it known that I, LOUIS C. LEOPOLD, a citizen of the United States, residing at Hancock, in the county of Pottawattamie, State of Iowa, have invented certain new and useful Improvements in Wagon-Brakes; and I do hereby declare the following to be a full, clear, and exact description of the invention, such as will enable others skilled in the art to which it appertains to make and use the same.

This invention relates to wagon brakes, and more particularly to a construction of brake which is particularly well adapted for use on hay wagons, the primary object of the invention being to provide a brake mechanism wherein the brake lever will be arranged for movement transversely of the hay rack, thus preventing the hay, being carried, interfering therewith.

A further object of the invention is to provide a construction of such nature that a direct pull will be had upon the brake rod.

Figure 1:
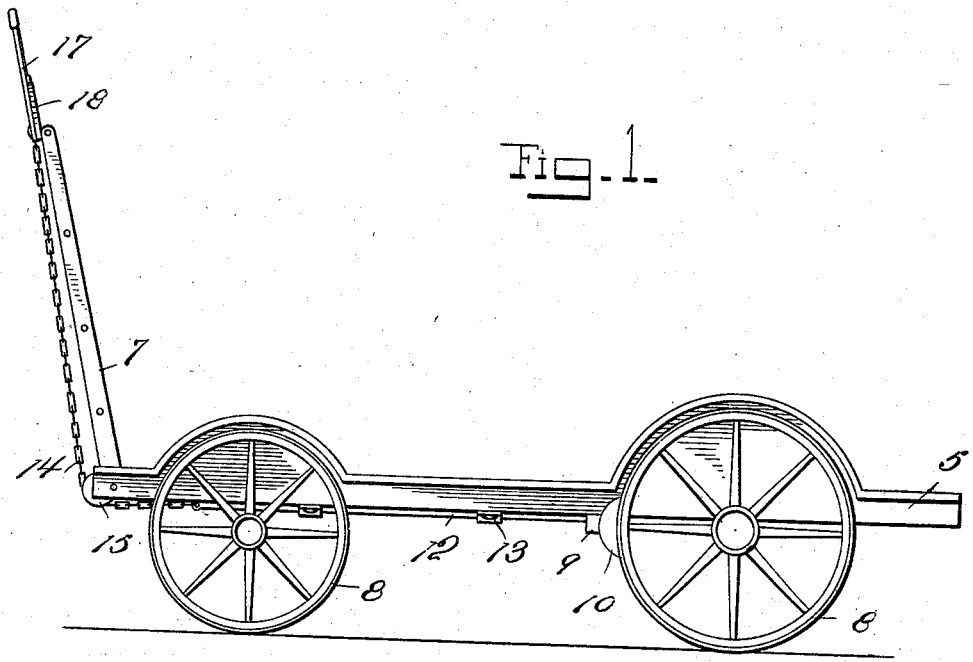
Figure 2:
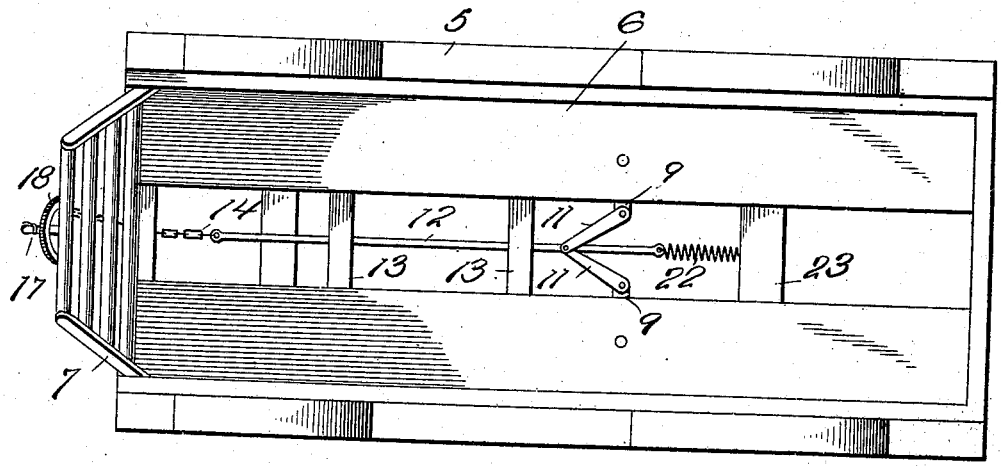

In the accompanying drawings—Figure 1 is a side elevation of a wagon showing my brake applied thereto. Fig. 2 is a plan view of the same. Fig. 3 is a front elevation, and Fig. 4 is a detail plan view of the rear end of the brake rod, the brake beams, and the spring for retracting the rod.

Referring more specifically to the drawings, the numeral 5 denotes a hay wagon of any desired construction, 6 the bed thereof, 7 the ladder and 8 the wheels.

Mounted for oscillating movement upon the underside of the bed 6 are the usual brake beams 9, carrying at their outer ends brake shoes 10 for engagement with the wheels 8. The inner ends of the brake beams are connected by means of toggle-links 11, and adjacent their ends and to the said links is pivoted a brake rod 12, which is slidably mounted in suitable brackets 13 upon the underside of the bed.

The forward end of the rod 12 terminates short of the front end of the wagon, and to the said end of the rod is connected one end of a chain 14, which is passed over a pulley 15, journaled upon the underside of the bed 6, and is connected at its opposite end to a crank-arm 16, formed at the lower end of a lever 17. The said lever is mounted for oscillatory movement, transversely of the wagon, upon the frame of a segmental rack 18, which is secured upon the ladder 7. A pawl 19 is pivoted to the lever 17 in position for coöperation with said rack, and upon the said lever is arranged a pawl actuating hand grip 20, which is connected with the pawl by means of a rod 21. From the foregoing it will be seen that the lever may be oscillated without striking the load of hay, and that, when oscillated, the brake rod 12 will be reciprocated to oscillate the brake beams 9.

To hold the beams normally in inoperative position, a spring 22 is connected at one of its ends to the rear end of the rod 12, and at its opposite end to a bracket 23 at the rear end of the bed 6.

What is claimed, is—

The combination with a wagon, of transverse brake beams pivoted between their ends and carrying brake shoes at their outer ends, the inner ends of said brake beams being spaced away, an operating rod supported longitudinally beneath said wagon for axial sliding movement, toggle links having common pivotal connection with said rod between the ends thereof, and having pivotal connection with the inner ends of said brake beam, a retractile coil spring fixed rearwardly of said rod and having an end connected to the rear ends of said rod, a lever pivoted to a stationary support and formed with a crank arm extending angularly from said pivot and transversely of said wagon, the end of said crank arm being designed for movement in an arc in a vertical plane, a pulley supported at the front end of said wagon, and a chain trained over said pulley and having connection with the end of said crank arm and with the forward end of said rod.

In testimony whereof, I affix my signature, in presence of two witnesses.

LOUIS C. LEOPOLD.

Witnesses:
JOHN LEOPOLD,
H. M. EAGER.